AVAILABLE COPY

UNITED STATES PATENT OFFICE.

JOSEF HERTKORN, OF BERLIN, GERMANY.

PROCESS OF MAKING CAMPHOR.

No. 901,708.  Specification of Letters Patent.  Patented Oct. 20, 1908.

Application filed June 1, 1908. Serial No. 435,888.

*To all whom it may concern:*

Be it known that I, JOSEF HERTKORN, doctor of philosophy, chemist, and resident of Berlin, Germany, whose post-office address is Paulstrasse 8, have invented a new and useful Improved Process of Making Camphor, of which the following is a specification.

My invention relates to a process for making camphor from borneol, isoborneol, or their esters, or a mixture of any of them with camphenes. This is accomplished by subjecting any or all of these materials to the action of nascent oxygen produced from an aqueous hypochlorite solution.

It is well known that camphor may be produced by the oxidation of the borneols, but the processes for doing this are in the main unsatisfactory. For example, the treatment of the borneols with free chlorin or with aqueous hypochlorite solutions, either with or without the addition of catalytic substances, are not satisfactory, because these processes also result in the production of large quantities of by-products and products of decomposition containing chlorin, which renders the complete separation of the camphor troublesome and even impossible from an economic standpoint. Moreover, the camphenes which are formed in considerable quantities in the direct processes for producing the borneol ethereal salts from oil of turpentine are entirely lost in the process recited above. Furthermore, the oxidation of the borneols with atmospheric oxygen under the action of heat, either with or without the presence of catalytic substances, is unsatisfactory, because the production of camphor is very small, far less than the theoretically possible yield, and this method is likewise objectionable in that it produces considerable quantities of by-products and products of decomposition which in the further treatment do not yield camphor.

My process, which is based on the formation of nascent oxygen in an alkaline, or neutral, or slightly acid solution, which oxygen oxidizes the borneols and at the same time the camphenes, if any are present, gives an approximately theoretical yield of camphor without the formation of any appreciable quantity of by-products and products of decomposition, as high as 96% of the theoretically possible yield being obtained.

The nascent oxygen is formed by treating any aqueous hypochlorite solution with a mixture of the salts of the metals, (including the oxids or hydrates) of the sulfid of hydrogen and sulfid of ammonium groups, such, for example, as the compounds of copper, lead, bismuth, antimony and the like mixed with the compounds of iron, manganese, zinc, cobalt, nickel, vanadium, titanium, uranium, molybdenum, tungsten, didymium and the like.

As is well known, hypochlorite solutions that are not too dilute are readily decomposed even at ordinary temperatures with the formation of nascent oxygen by a mixture of copper and iron salts, or copper and manganese salts, whereas each such salts, if used singly, do not possess this property.

For the complete decomposition of the hypochlorite solution, about 0.3 to one per cent. of the metallic salts of the sulfid of hydrogen group, mixed with from 1.5 to three per cent. of the salts of the sulfid of ammonium group, is used.

The cheapest hypochlorite is the chlorid of lime of commerce or the dilute hypochlorite or bleaching lyes produced electrolytically by the decomposition of the alkaline chlorids, such as rock salt.

Example: 40 kilos of chlorid of lime are made into a cream with from 600 to 1000 liters of water. This, or a corresponding quantity of hypochlorite of sodium lye or the like, is mixed with about two kilos of sulfate of copper or chlorid of copper and about 6 kilos of sulfate or chlorid of iron or manganese, as a saturated solution.

The mixture is slightly heated to start the reaction, after which the reaction proceeds by itself and sets free oxygen. When the production of oxygen begins, 25 to 27 kilos of borneol, or isoborneol, or camphene, or a mixture of these substances or their etheral salts, are added to the liquid, the whole being constantly stirred. The borneol or similar substance may be added directly or it may be dissolved in benzin or benzol and the solution added. These substances are mixed and constantly stirred until the hypochlorite is completely decomposed. If the heat generated by the chemical reaction goes too high, that is, above 25° C., it may be reduced either by diluting the solution with water or cooling the vessel containing the solution. If the heat is allowed to rise above 25° C. the evolution of oxygen will be so rapid that bubbles of free oxygen will rise through the solution, thus causing a waste of oxygen.

The temperature should be kept low enough to prevent the formation of bubbles and should never be allowed to rise above 25° C. The product is then treated with steam, which separates the camphor-benzin or camphor-benzol solution from the oxidizing liquid, and is then further treated in the usual way to convert it into solid camphor. The camphor obtained by this means is snow-white and equivalent in all respects to natural camphor. It has a melting point of 175° C.

If the entire quantities of material recited above are mixed together at once, the chemical action, as soon as it begins, is quite violent and the formation of oxygen may be delayed by cooling the vessel, by diluting the liquid with water, by adding the solution of the metallic salts by degrees to the hypochlorite solution (which may be a concentrated solution), or by adding the energized hypochlorite solution by degrees to the borneol solution.

The mixture of metallic hydrates deposited from the oxidizing liquid may be used over and over again for further oxidizing purposes as often as desired, especially when chlorids are used.

I claim:—

1. The process of producing camphor by subjecting borneol to nascent oxygen, which consists in adding to a hypochlorite solution a mixture of a salt of one of the metals of the sulfid of ammonium group and a salt of one of the metals of the sulfid of hydrogen group, and adding borneol to the resulting mixture, substantially as described.

2. The process of producing camphor, which consists in adding to a solution of hypochlorite of lime a mixture containing chlorid of iron and chlorid of copper in solution and slowly stirring borneol into the resulting product, substantially as described.

3. The process of producing camphor which consists in adding to a strong solution of hypochlorite of lime a strong solution containing chlorid of copper and chlorid of iron, adding borneol to the resulting mixture, controlling the temperature during the oxidation of the borneol by said resulting mixture, and purifying the oxidized product, substantially as described.

In testimony, that I claim the foregoing as my invention, I have signed my name in presence of two witnesses, this 19th day of May 1908.

JOSEF HERTKORN.

Witnesses:
WOLDEMAR HAUPT,
HENRY HASPER.